United States Patent Office 3,394,162
Patented July 23, 1968

3,394,162
NOVEL COMPOUNDS AND POLYMERS
Robert Arnold Braun, Newark, Del., assignor to E. I. du Pont de Nemours and Company, Wilmington, Del., a corporation of Delaware
No Drawing. Filed Nov. 25, 1964, Ser. No. 413,983
6 Claims. (Cl. 260—448.8)

ABSTRACT OF THE DISCLOSURE

Compounds of the formula

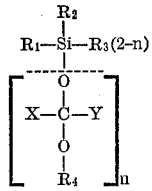

where

X and Y are perfluoroalkyl or perchloro - fluoroalkyl radicals,
$R_1$, $R_2$, $R_3$ and $R_4$ are alkyl or alkoxy radicals, and
$n$ is 1 or 2, a process for preparing these compounds, and oligomers of these compounds. The novel compounds are useful as hydraulic fluids, water repellants, and stain repellants.

This invention relates to novel compounds and oligomers containing silicon and fluorine.

It is more particularly directed to compounds having the structure (I)

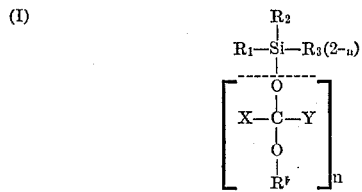

where

X and Y can be perfluoroalkyl or perchloro-fluoroalkyl, all of one through five carbon atoms;
$R_1$, $R_2$ and $R_3$ can be hydrogen; alkenyl of 2 through 5 carbon atoms; alkyl of 1 through 12 carbon atoms; alkoxy of 1 through 5 carbon atoms; alkoxy of 1 through 5 carbon atoms substituted with alkoxy of 1 through 5 carbon atoms; phenyl; alkyl of 1 through 6 carbon atoms substituted with

—CN

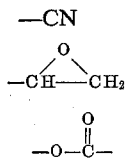

alkenyl of 2 or 3 carbon atoms, or

alkyl of 1 through 5 carbon atoms;

—$OR_1$, —$OR_2$ or —$OR_3$ $R_4$ can be alkyl of 1 through 12 carbon atoms; and
$n$ is 1 or 2, except that when $n$ is 2, only two of $R_1$, $R_2$ $R_3$ can be present.

The invention is also more particularly directed to oligomers having the structure (2)

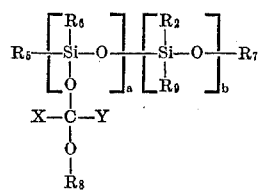

where

X and Y are defined as in Formula 1;
$R_5$ and $R_6$ can be alkyl of 1 through 5 carbon atoms; phenyl; or —O—alkyl of 1 through 5 carbon atoms;
$R_7$ can be alkyl of 1 through 5 carbon atoms or phenyl;
$R_8$ can be alkyl of 1 through 12 carbon atoms;
$R_9$ can be alkyl or —O—alkyl of 1 through 12 carbon atoms;
$a$ can be a number 1 through 5; and
$b$ can be a number 1 through 10.

Preparation of compounds and oligomers

The compounds of Formula 1 and the oligomers of Formula 2 can be prepared by reacting an alkoxy silane or an alkoxy siloxane with a perfluoro ketone or perfluorochloro ketone according to the following equations:

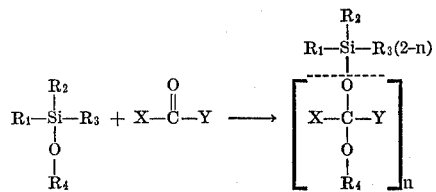

(For preparing compounds of Formula 1)

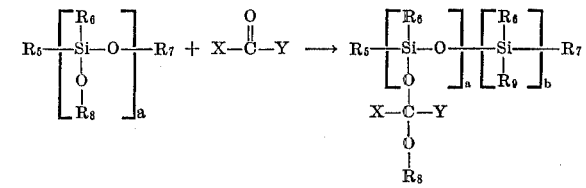

(For preparing the oligomers of Formula 2)

Where, in both equations, $R_1$–$R_9$, X, Y, $m$, $n$, $a$ and $b$ are defined as in Formulae 1 and 2 respectively.

The compounds of Formulae 1 and 2 can be prepared according to Equations 3 and 4 by bringing the reactants, all of which are available commercially, together in a pressure reactor. In Equation 3, reactant proportions are equimolar when $n$ is 1; a molar excess of the ketone is used when $n$ is more than 1.

The reactor is kept at 100–200° C., at autogenous pressure, for from 4 to 8 hours. At the end of the reaction period, the reactor is vented to allow any excess ketone to escape, or if the unreacted ketone is a liquid, the residue is heated slightly under vacuum.

The products are, generally speaking, colorless fluids or oils. They emerge from the reaction as relatively pure products which can, if desired, be further purified by distillation under reduced pressure.

Utility

The compounds and oligomers of Formulae 1 and 2 are useful as hydraulic fluids.

Those compounds of Formula 1 which have a hydrogen atom bonded directly to the silicon atom, viz., the compounds having the structure (5)
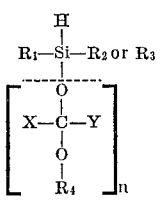

where $R_1$–$R_4$, X, Y and $n$ are defined as in Formula 1, are highly useful for treating fabrics to make them water and stain repellant.

Preferred for this use because of their effectiveness are the compounds (6)
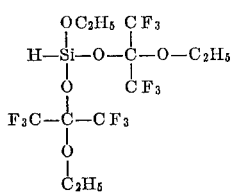

Such compounds are applied to substrates to be treated as 1–10% solutions, by weight, in organic solvents. The solutions can be applied by such conventional means as dipping or spraying. The substrates thus treated are then baked at 50–150° C. for about 5 minutes, or are simply air dried at room temperature for a prolonged period.

Those compounds of Formula 1 in which $R_1$, $R_2$ or $R_3$ is an alkenyl radical can be made to undergo additional polymerization, using techniques well known in the art, to give polymers which are useful as film-forming components in coating compositions.

The following examples are presented so that the invention will be more easily understood and readily practiced. These examples are intended to be illustrative and show only the preferred embodiments of the invention. Those skilled in the art will no doubt be able to introduce numerous variables into the disclosures, the foremost among these being the attachment of innocuous substituents to the basic nuclei. These departures from the disclosures are naturally embraced by the basic inventive concept.

EXAMPLE 1

A mixture of tetraethoxysilane (65.5 parts, 0.4 mole) and hexafluoroacetone (133 parts, 0.8 mole) were heated in a bomb at 150° C. for six hours. The bomb was then vented and the crude product (173 parts) was fractionally distilled to give 76.8 parts of a substantially pure compound having the structure

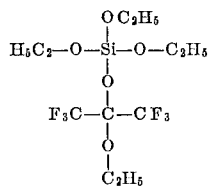

This liquid product had a boiling point of 28° C. at 0.5 mm. of pressure, and a refractive index of $N_{25}^D$ 1.3483.

EXAMPLE 2

The residue from the distillation in Example 1 was itself fractionally distilled. The liquid product had the structure

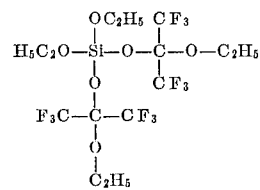

It had a boiling point of 45° C. at 0.5 mm. of pressure, and a refractive index of $N_{25}^D$ 1.3418.

EXAMPLE 3

A mixture of triethoxysilane (24.6 parts, 0.15 mole) and hexafluoroacetone (50 parts, 0.3 mole) was heated in a bomb at 175° C. for 6 hours. The bomb was then vented and the residue fractionally distilled to give 44.4 parts of a liquid product having a boiling point of 28° C. at 0.08 mm. of pressure, a refractive index of $N_{25}^D$ 1.3343, and the structure

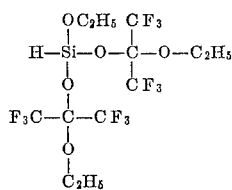

A 1%, by weight, solution of this compound in carbon tetrachloride was applied, by dipping, to a piece of cotton fabric. This fabric was air dried at room temperature for about ½ hour and then baked at 50° C. for 30 minutes. This treatment made the fabric highly water repellant and resistant to soiling by such things as mustard, ketchup and ink.

EXAMPLE 4

A mixture of vinyltriethoxysilane (57 parts, 0.3 mole) and hexafluoroacetone (100 parts, 0.6 mole) was heated in a bomb at 150° C. for about six hours. The bomb was then vented and the remaining liquid material (122 parts) was fractionally distilled to give 61.3 parts of a substantially pure compound having the structure

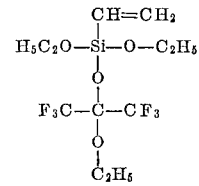

This compound had a boiling point of 100° C. at 46 mm. of pressure and a refractive index of $N_{25}^D$ 1.3622.

EXAMPLE 5

A mixture of dimethyldiethoxysilane (41.4 parts, 0.3 mole) and hexafluoroacetone (100 parts, 0.6 mole) was heated at 150° C. in a bomb for six hours.

The excess hexafluoroacetone was then vented from the bomb, leaving behind 106 parts of a liquid product. This product was fractionally distilled to give 51.8 parts of a colorless liquid having a boiling point of 60° C. at 0.35 mm. of pressure, and a refractive index of $N_{25}^D$ 1.3375. The product had the structure

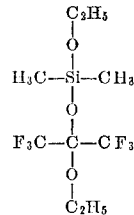

EXAMPLE 6

A mixture of β-carbethoxyethyltriethoxysilane (52.8 parts, 0.2 mole) and hexafluoroacetone (100 parts, 0.6 mole) was heated in a bomb at 150° C. for 8 hours. The bomb was vented and the liquid product fractionated to give 40 parts of a substantially pure colorless liquid having a boiling point of 78–81° C. at 0.35 mm. of pressure and a refractive index of $N_{25}^D$ 1.3872.

This compound had the structure $$H_5C_2O-\underset{\parallel}{\overset{O}{C}}-(CH_2)_2-\underset{\underset{\underset{C_2H_5}{|}}{\underset{O}{|}}}{\underset{\underset{F_3C-\underset{|}{\overset{|}{C}}-CF_3}{|}}{\overset{OC_2H_5}{\underset{|}{Si}}-OC_2H_5}}$$

EXAMPLE 7

A compound having the structure

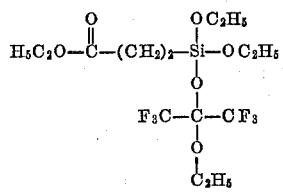

(149 parts, 0.6 mole) and hexafluoroacetone, (100 parts, 0.6 mole) were heated together in a bomb at 125° C. for six hours. The liquid product (243.5 parts) was then fractionated to give 154 parts of a colorless liquid having a boiling point of 110–112° C. at 1.5 mm. of pressure and a refractive index of $N_{25}^D$ 1.3933. This compound had the structure

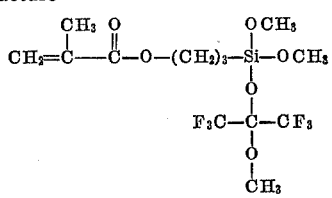

This compound undergoes addition-polymerization easily and must therefore either be stored in the cold or must be inhibited with a polymerization inhibitor such as hydroquinone.

The compounds in the following table, in the listed proportions, can be reacted with hexafluoroacetone (149 parts, 0.6 mole) in a similar fashion to give the corresponding listed products:

| Reactant | Parts by Weight | Product |
|---|---|---|
| NC—(CH₂)₂—Si(OC₂H₅)₃<br>β-cyanoethyl triethoxy silane. | 130 g., 0.6 mole | $NC-(CH_2)_2-\underset{\underset{OC_2H_5}{|}}{\overset{OC_2H_5}{|}}{Si}-O-\underset{\underset{CF_3}{|}}{\overset{CF_3}{|}}{C}-O-C_2H_5$ |
| (CH₃O)₂Si(O—CH₂—CH₂—OCH₃)₂<br>Dimethoxy bis (2-methoxy ethoxy)-silane. | 144 g., 0.6 mole | $H_3CO-(CH_2)_2-O-\underset{\underset{O}{\mid}}{\overset{\overset{CH_3}{\mid}}{\overset{O}{\mid}}}{\underset{\mid}{Si}}-O-\underset{\underset{CF_3}{\mid}}{\overset{CF_3}{\mid}}{C}-OCH_3$ with additional $F_3C-\underset{\underset{OCH_3}{\mid}}{\overset{\overset{OCH_3}{\mid}}{C}}-CF_3$ |
| $\overset{O}{\overset{/\backslash}{CH_2-CH}}-CH_2O(CH_2)_3-Si(OCH_3)_3$ | 142 g., 0.6 mole | $\overset{O}{\overset{/\backslash}{CH_2-CH}}-CH_2O(CH_2)_3-\underset{\underset{O}{\mid}}{\overset{\overset{OCH_3}{\mid}}{Si}}-OCH_3$ with $FC_3-\underset{\underset{CH_3}{\mid}}{\overset{\overset{O}{\mid}}{C}}-CF_3$ |
| C₆H₅Si(OC₂H₅)₃<br>Phenyl triethoxy silane. | 144 g., 0.6 mole | $C_6H_5\underset{\underset{OC_2H_5}{\mid}}{\overset{\overset{OC_2H_5}{\mid}}{Si}}-O-C(CF_3)_2-OC_2H_5$ |

EXAMPLE 8

Fifty parts (0.0672 mole) of the polyethylsilicate having the structure

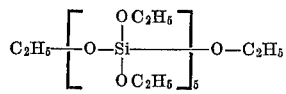

and hexafluoroacetone (50 parts, 0.3 mole) were heated in a bomb for six hours at 150° C. The bomb was vented and excess ketone was stripped off by heating at 40° C. for 30 minutes. The product contained 2 moles of hexafluoroacetone and had the structure

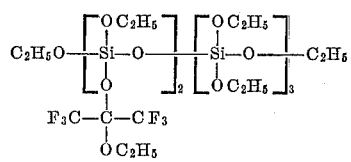

EXAMPLE 9

Dimethyltriphenyltrimethoxytrisiloxane (47 parts, 0.1 mole) having the structure

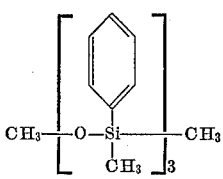

50 parts of benzene and hexafluoroacetone (50 parts, 0.3 mole) were heated in a bomb at 150° C. for six hours. The bomb was then vented and the liquid residue was stripped at 25° C. and 10 mm. of pressure to remove solvent and excess ketone. The residue of colorless oil (73.5 parts) had the general structure

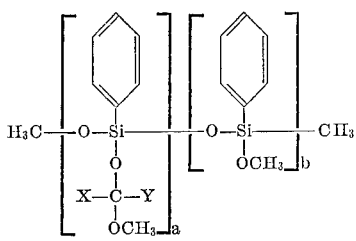

The product is a mixture (50–50) of compounds of this formula where $a$ is 1 and $b$ is 2 (the sum of $a$ and $b$ naturally being 3).

It should be understood that other perfluoro ketones and perfluoro- chloro ketones can be used in place of hexafluoroacetone in the foregoing examples, in the same molar proportions, to obtain the corresponding products.

I claim:
1. A compound of the formula

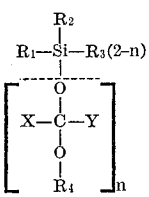

where

X and Y are selected from the group consisting of perfluoroalkyl and perchloro-fluoroalkyl, all of 1 through 5 carbon atoms, $R_1$, $R_2$ and $R_3$ are selected from the group consisting of hydrogen; alkenyl of 2 through 5 carbon atoms; alkyl of 1 through 12 carbon atoms; alkoxy of 1 through 5 carbon atoms; alkoxy of 1 through 5 carbon atoms substituted with alkoxy of 1 through 5 carbon atoms; phenyl; alkyl of 1 through 6 carbon atoms substituted with a member of the group consisting of

—CN

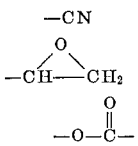

alkenyl of 2–3 carbon atoms, and $$-\overset{O}{\underset{\|}{C}}-$$

alkyl of 1 through 5 carbon atoms;

—$OR_1$, —$OR_2$ and —$OR_3$;

$R_4$ is alkyl of 1 through 12 carbon atoms; and $n$ is a whole number less than three.

2. An oligomer of the formula

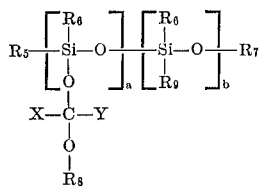

where

X and Y are selected from the group consisting of perfluoroalkyl and perfluoro-chloro alkyl, all of 1 through 5 carbon atoms;

$R_5$ and $R_6$ are selected from the group consisting of alkyl of 1 through 5 carbon atoms, phenyl and —O—alkyl of 1 through 5 carbon atoms;

$R_7$ is selected from the group consisting of alkyl of 1 through 5 carbon atoms and phenyl;

$R_8$ is alkyl of 1 through 12 carbon atoms;

$R_9$ is selected from the group consisting of alkyl and —O—alkyl of 1 through 12 carbon atoms;

$a$ is a number 1 through 5; and
$b$ is a number 1 through 10.

3. A compound having the formula

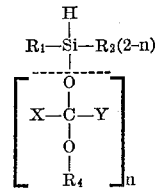

where

X and Y are selected from the group consisting of perfluoroalkyl and perchloro-fluoroalkyl, all of 1 through 5 carbon atoms, $R_1$ and $R_2$ are selected from the group consisting of hydrogen; alkenyl of 2 through 5 carbon atoms; alkyl of 1 through 12 carbon atoms; alkoxy of 1 through 5 carbon atoms; alkoxy of 1 through 5 carbon atoms substituted with alkoxy of 1 through 5 carbon atoms; phenyl; alkyl of 1 through 6 carbon atoms substituted with a member of the group consisting of

—CN

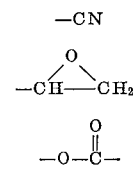

alkenyl of 2–3 carbon atoms, and $$-\overset{O}{\underset{\|}{C}}-$$

alkyl of 1 through 5 carbon atoms;

—$OR_1$ and —$OR_2$ $R_4$ is alkyl of 1 through 12 carbon atoms; and
$n$ is a whole number less than three.

4. A compound having the formula

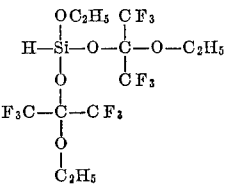

5. A process for preparing a compound of the formula

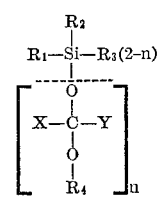

where

X and Y are selected from the group consisting of perfluoroalkyl and perchloro-fluoroalkyl, all of 1 through 5 carbon atoms, $R_1$, $R_2$ and $R_3$ are selected from the group consisting of hydrogen; alkenyl of 2 through 5 carbon atoms; alkyl of 1 through 12 carbon atoms; alkoxy of 1 through 5 carbon atoms; alkoxy of 1 through 5 carbon atoms substituted with alkoxy of 1 through 5 carbon atoms;

phenyl; alkyl of 1 through 6 carbon atoms substituted with a member of the group consisting of

—CN

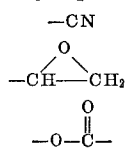

alkenyl of 2–3 carbon atoms, and

alkyl of 1 through 5 carbon atoms;

$-OR_1$, $-OR_2$ and $-OR_3$ $R_4$ is alkyl of 1 through 12 carbon atoms; and
$n$ is a whole number less than three, said process comprising reacting a silane of the formula

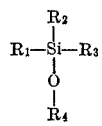

where $R_1$, $R_2$, $R_3$ and $R_4$ are defined as above, with a ketone of the formula $$X-\underset{\underset{O}{\|}}{C}-Y$$

where X and Y are defined as above, the amount of ketone used being equimolar when $n$ is 1 and in molar excess when $n$ is 2.

6. A process for preparing an oligomer of the structure

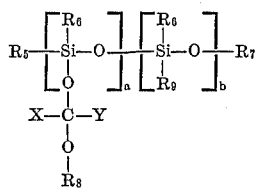

where $R_5$ and $R_6$ are selected from the group consisting of alkyl of 1 through 5 carbon atoms, phenyl and —O—alkyl of 1 through 5 carbon atoms;
$R_7$ is selected from the group consisting of alkyl of 1 through 5 carbon atoms and phenyl;
$R_8$ is alkyl of 1 through 12 carbon atoms;
$R_9$ is selected from the group consisting of alkyl and —O—alkyl of 1 through 12 carbon atoms;
$a$ is a number of 1 through 5; and
$b$ is a number 1 through 10.

said process comprising reacting a compound of the structure

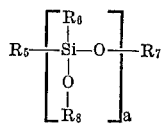

where $R_5$, $R_6$, $R_7$, $R_8$ and $a$ are as defined above, with a ketone of the formula

where X and Y are as defined above.

References Cited

UNITED STATES PATENTS 3,038,000  6/1962  Schmidt _____ 260—448.8 XR

FOREIGN PATENTS 621,428  6/1961  Canada.
621,459  6/1961  Canada.

TOBIAS E. LEVOW, *Primary Examiner.*

P. F. SHAVER, *Assistant Examiner.*